US007451491B2

(12) United States Patent
Watanabe et al.

(10) Patent No.: US 7,451,491 B2
(45) Date of Patent: Nov. 11, 2008

(54) METHOD AND A DEVICE FOR ALLOWING ONLY A SPECIFIC KIND OF HARDWARE TO CORRECTLY EXECUTE SOFTWARE

(75) Inventors: Momoto Watanabe, Tokyo (JP); Hiroaki Sano, Saitama (JP); Makoto Hanawa, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 422 days.

(21) Appl. No.: 11/235,271

(22) Filed: Sep. 27, 2005

(65) Prior Publication Data

US 2006/0070057 A1 Mar. 30, 2006

(30) Foreign Application Priority Data

Sep. 29, 2004 (JP) ............................. 2004-284440

(51) Int. Cl.
*H04L 9/00* (2006.01)
*H04L 9/32* (2006.01)
*G06F 9/00* (2006.01)
*G06F 15/177* (2006.01)
*G06F 1/24* (2006.01)

(52) U.S. Cl. ............................. 726/26; 726/33; 713/1; 713/2; 713/100

(58) Field of Classification Search ................... 713/1, 713/2, 100; 726/26, 33
See application file for complete search history.

(56) References Cited

U.S. PATENT DOCUMENTS

| 4,688,169 | A | * | 8/1987 | Joshi | ............................. 726/29 |
| 5,070,479 | A | * | 12/1991 | Nakagawa | .................... 714/11 |
| 5,113,518 | A | * | 5/1992 | Durst et al. | .................... 726/29 |
| 5,430,878 | A | * | 7/1995 | Straub et al. | ................. 717/162 |
| 5,577,232 | A | * | 11/1996 | Priem et al. | .................. 717/170 |
| 5,671,435 | A | * | 9/1997 | Alpert | ........................... 712/38 |
| 2006/0075397 | A1 | * | 4/2006 | Kasahara | ..................... 717/170 |

FOREIGN PATENT DOCUMENTS

| JP | 07-219761 | 8/1995 |
| JP | 2002-258963 | 9/2002 |
| JP | 2004-171500 | 6/2004 |

* cited by examiner

*Primary Examiner*—Thomas Lee
*Assistant Examiner*—Ji H Bae
(74) *Attorney, Agent, or Firm*—Rabin & Berdo, P.C.

(57) ABSTRACT

A method of limiting the use of software determines, before the software is executed on hardware, whether or not the hardware has a specific configuration inherent in a specific kind of hardware. If it is determined that the hardware has the specific configuration, then the method allows the software to be executed on that hardware. Otherwise, the method runs the software with a penalty incorporated therein such as to substantially be unusable. This allows the software to be correctly executed only by the specific kind of hardware.

15 Claims, 7 Drawing Sheets

METHOD AND A DEVICE FOR ALLOWING ONLY A SPECIFIC KIND OF HARDWARE TO CORRECTLY EXECUTE SOFTWARE

BACKGROUND OF THE INVENTION

1. Field of the Invention

The present invention relates to a method of restricting the use of software in order to protect it from illicit use.

2. Description of the Background Art

Software available on the market for use in a computer is generally allowed to be used only by a person having purchased it. However, because such software is versatile, it is likely that the software is illicitly copied and used on another computer not authorized. Computers are provided with a keyboard or similar manual input unit on which the user of the computer can input various kinds of information.

On the other hand, there is software preinstalled in a refrigerator, microwave oven or similar household electrical appliance provided with or without some kind of manual input unit. Let this kind of software be referred to as preinstalled software hereinafter. In a broader sense, software already installed in computers prior to marketing may also be referred to as preinstalled software.

In any case, preinstalled software is usually expected to be used only by hardware in which it is preinstalled, i.e. allowed to be used on hardware produced by a particular manufacturer, but inhibited from being used on hardware produced by other manufacturers not authorized. However, if software preinstalled in hardware produced by a particular manufacturer is versatile, then it is likely that the preinstalled software is illicitly copied and used on other hardware not authorized, i.e. another kind of hardware. When such illicit use of the preinstalled software is revealed, that particular manufacturer is able to take legal means for claiming damages. Usually, however, it is difficult to expose this kind of illicit use.

In light of the above, Japanese patent laid-open publication Nos. 219761/1995, 2002-258963 and 2004-171500, for example, disclose particular methods of protecting software from illicit use. Publication No. 219761/1995, for example, teaches a method that urges a person to input a keyword on a keyboard or manual input unit and then allows, if the keyword is correct, the person to operate software. This kind of method has, however, some problems left unsolved, as will be described hereinafter.

The software protecting methods taught in the above-indicated prior art documents are not practicable because of resorting to a manual input unit and a password to be input on the input unit, and therefore not applicable to software preinstalled in specific sorts of hardware provided with a hardware-specific type of manual input unit or without being provided with any manual input unit, such as popular household electrical appliances.

Further, the conventional software protecting methods take measures of, when the illicit use of the software is determined, limiting the functions available with that software or practically inhibiting the whole software from being operative. This, however, allows a user to learn the software protection rendered operative, and therefore become aware of a protection program sequence embedded in just before the program step of that software restricted in operation or made inoperative. Stated in another way, a protection program sequence can be relatively easily decoded if the execution history thereof is traced. Consequently, the user may succeed in invalidating the protection program sequence although spending time. The protection program sequence, therefore, fails to fully obviate illicit use of software.

SUMMARY OF THE INVENTION

It is an object of the present invention to provide a method capable of protecting the preinstalled software of a household electrical appliance or similar hardware not provided with a general-purpose manual input unit from illicit use, and moreover hiding the protection itself to thereby cope with the invalidation of the protection, and a device for practicing the same.

A method of restricting the use of software of the present invention determines, before the software is executed on hardware, whether or not the hardware has a configuration specific to a specific kind of hardware. If the hardware has the specific configuration, then the method executes the software on the hardware. This allows the software to be correctly executed only by the specific kind of hardware.

In accordance with the invention, a procedure of limiting a use of software is also provided, which procedure comprises a first step of determining, before the software is executed on first hardware, whether or not the first hardware has a specific configuration inherent in a specific kind of hardware, and a second step of executing, if it is determined that the first hardware does not have the specific configuration, the software on the first hardware with a penalty incorporated therein to render the software substantially unusable. A device for practicing the method stated above is also provided.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
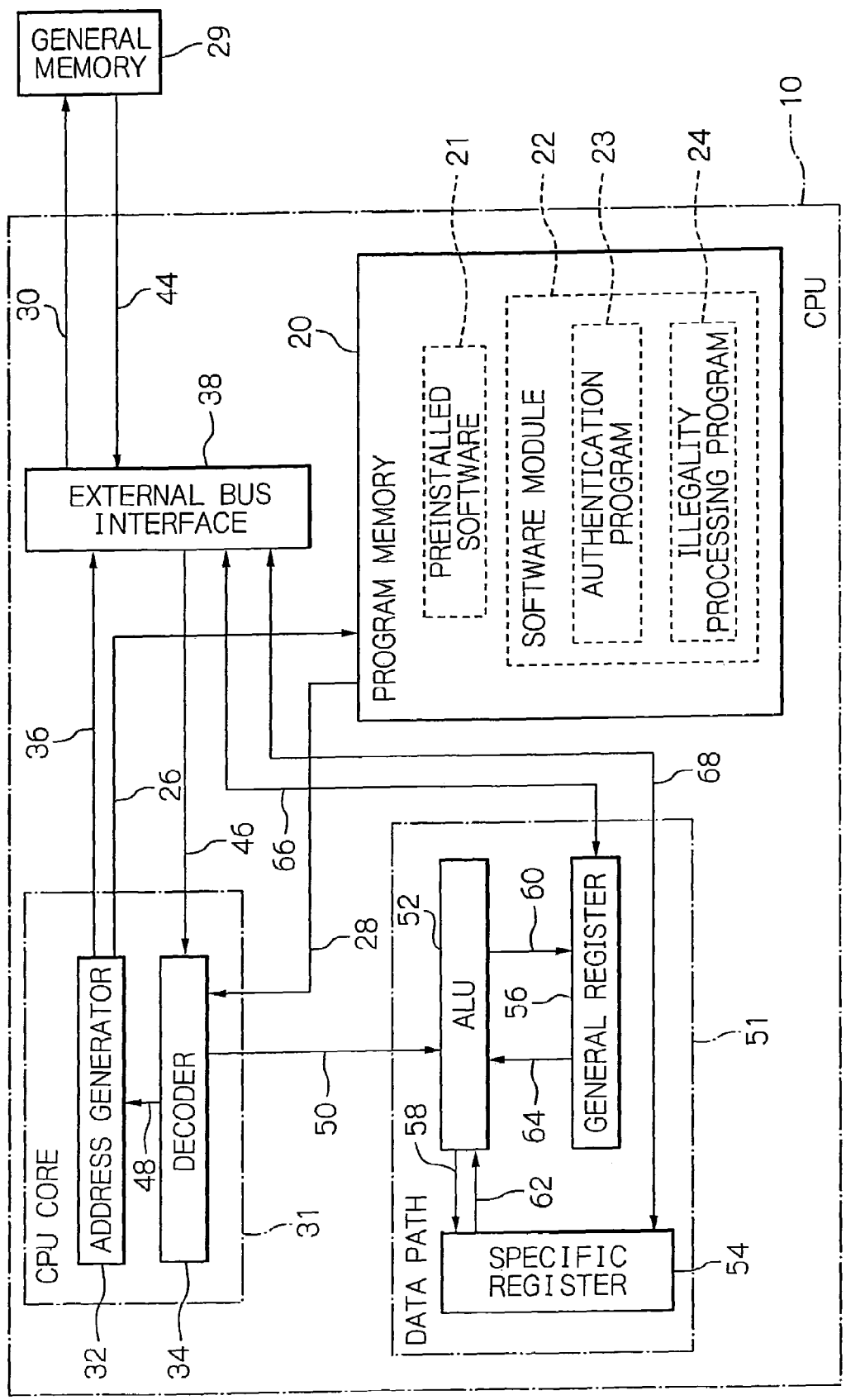
FIG. 1 is a schematic block diagram showing an embodiment including a central processing unit (CPU) and a general-purpose memory device separately provided from the central processing unit in accordance with the present invention.

Referring to FIG. 1 of the drawings, specific circuitry for practicing a preferred embodiment of the present invention generally comprises a central processing unit (CPU) 10 and a general-purpose memory 29 separately provided from the central processing unit 10. The central processor unit, or processor circuitry, 10 plays the role of a main control unit included in a computer system or an intelligent mobile device such as a cellular phone terminal or a personal digital assistant. It is noteworthy that the illustrative embodiment causes a type of hardware, which is adapted to execute preinstalled software or firmware even without awaiting a user's input, to protect the preinstalled software from illicit use. Therefore, the central processor 10 may be included in a household electrical appliance or a similar sort of hardware not provided with a general-purpose manual input device to manually be operated by the user.

The central processor 10 includes a program memory 20 storing therein preinstalled software 21 and a software module 22. The software, or program, module 22 includes an authenticating program 23 and an illegality processing program 24. The software module 22 is responsive to a signal input on a signal line 28 to selectively output the data streams of the preinstalled software 21, authenticating program 23 and illegality processing program 24 over a data line 28. The general-purpose memory 29 is adapted for storing therein data input over a data line 30.

The central processor 10 includes a CPU core 31 comprising an address generator 32 and a decoder 34 interconnected as illustrated in the figure. The address generator 32 is adapted for sending out a signal over a signal line 36 through an external bus interface 38 to an external bus 30 for causing an instruction to be read out from the general-purpose memory 29 so as to receive the instruction thus read out by the decoder 34 over an external bus 44 through the external bus interface 38 to a data line 46. The address generator 32 is further adapted for producing a signal on a signal line 26 to read out an instruction from the program memory so as to receive the instruction thus read out by the decoder 34 over the data line 28. In addition, the address generator 32 is adapted for receiving an address from the decoder 34 on a signal line 48 to read out an instruction stored in a storage location designated by the address from the program memory 20 or the general-purpose memory 24.

The decoder 34 is adapted to receive an instruction read out on the data line 28 or 46 in response to the address generator 32 and decode or analyze the instruction. If the instruction thus decoded is indicative of a distinct address, then the decoder 34 delivers the distinct address to the address generator 32 over the signal line 48. If the decoded instruction is indicative of an operation, then the decoder 34 delivers the content of the operation to an ALU (Arithmetic and Logic Unit) 52 over a signal line 50.

The central processor 10 includes a section referred to as a data path 51, which includes a register referred to as "specific register" 54 and a general-purpose register 56 in addition to the ALU 52. The ALU 52 is adapted to perform an arithmetic or logical operation in accordance with the content of the operation input from the decoder 34 on the signal line 50. The specific register 54 and general-purpose register 56 are temporary storage devices for storing therein an interim result obtained from the calculation made by the ALU 52. Therefore, the ALU 52 can, when carrying out an operation, send out the interim result of calculation to the specific register 54 and general-purpose register 56 on the data lines 58 and 60, respectively, to store it. Further, data stored in the registers 54 and 56 can be transferred to the ALU 52 on the data lines 62 and 64, respectively. Data stored in the registers 54 and 56 may also be transferred to the general-purpose memory 29 over the signal lines 66 and 68, respectively, while data can be transferred from the latter to the former, as needed.

The specific register 54 is specifically provided in the specific central processor 10 shown in FIG. 1, i.e. the central processor authorized to execute a specific program sequence preinstalled. By contrast, central processor units not authorized to execute that specific program sequence, or software, such as manufactured by other manufacturers, do not include circuitry corresponding to the specific register 54. This allows that specific central processor 10 to be distinguished from the other kinds of CPUs. It is to be noted that the specific register 54 may be replaced with any other implementation capable of distinguishing a specific central processor from other CPUs. In the context, it is to be noted that the word "kind" or "type" is used in terms of distinguishing a specific central processor unit authorized to execute a specific program sequence or software from other central processor units not authorized to do so as far as central processor units are concerned.

Figure 2:
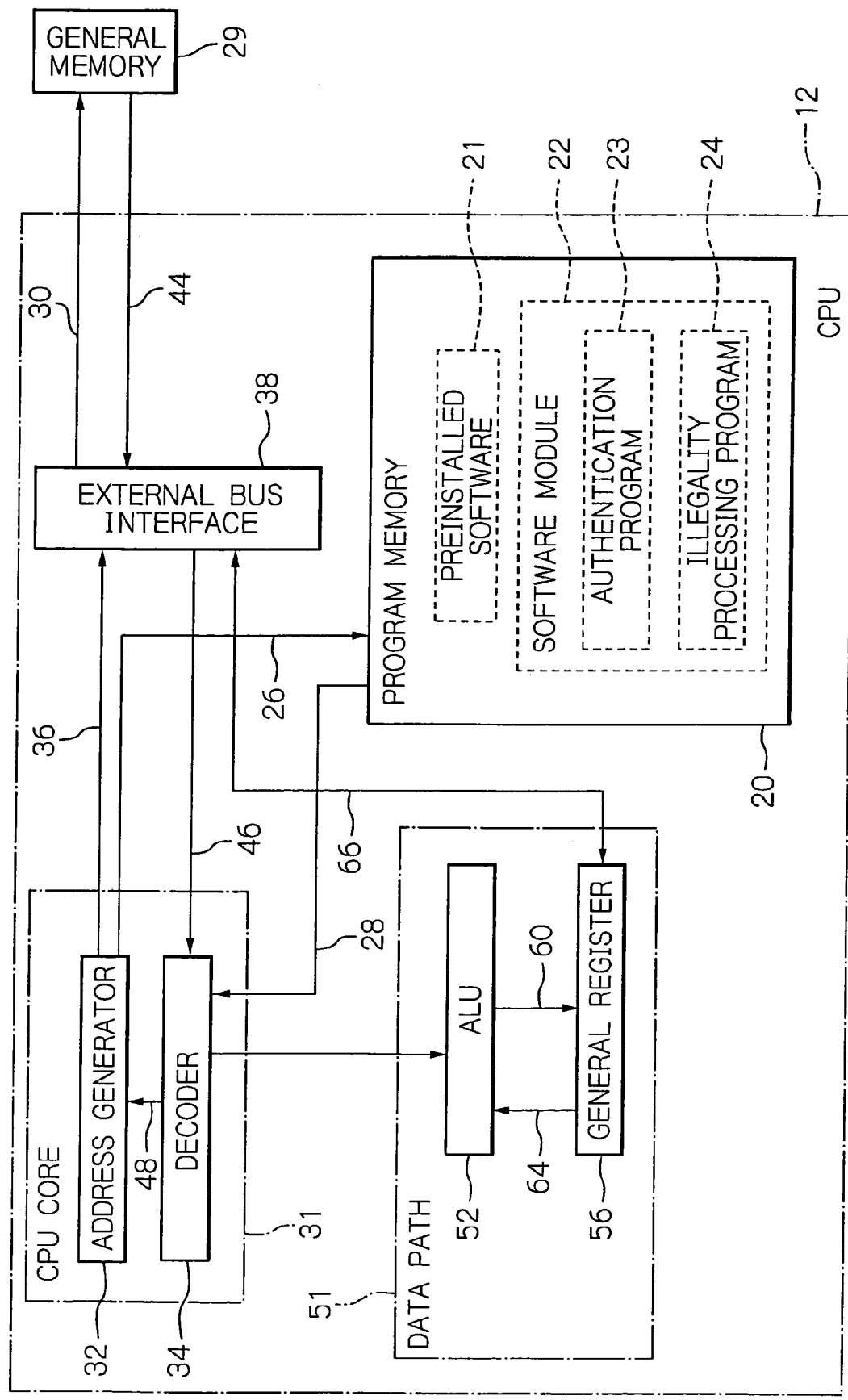
FIG. 2 is a schematic block diagram showing a processor system to which the present invention is applicable to render the system inefficient, the system corresponding to the embodiment shown in FIG. 1 with the specific register removed.

Now, FIG. 2 shows a processor system to which the present invention is applicable to render the system inefficient. As seen from the figure, the processor system illustrated is identical with the embodiment shown in FIG. 1 except that a central processor unit 12 does not include an element corresponding to the specific register 54. The basic concept underlying the present invention is to allow the central processor 10, FIG. 1, not only to execute the preinstalled software 21 but also not allow the central processor unit 12, FIG. 2, to substantially execute the same software 21, as will be described more specifically later. In that sense, the processor unit 12 can be said different in kind from the processor unit 10.

Figure 3:
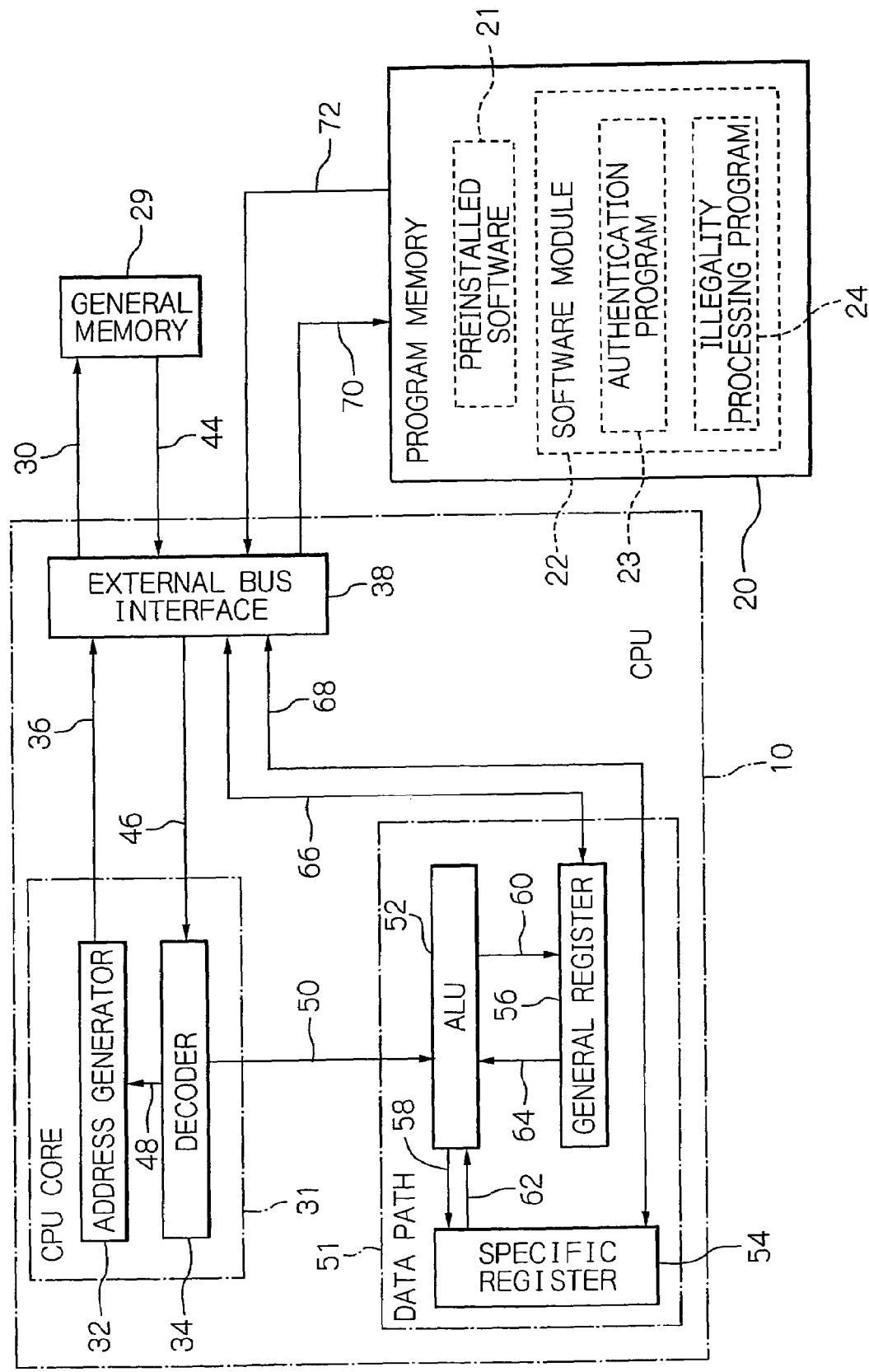
FIG. 3 is a schematic block diagram showing an alternative embodiment of the invention.

FIG. 3 shows an alternative embodiment of the invention. As shown, the program memory 20 is located outside of, i.e. physically separately from, the central processor unit or circuitry 10. In this embodiment, the address generator 32 reads out an instruction from the program memory 20 by transferring an address via the external interface 38 over a signal bus 70 to the program memory 38 so as to develop an instruction on a signal bus 72.

Figure 4:
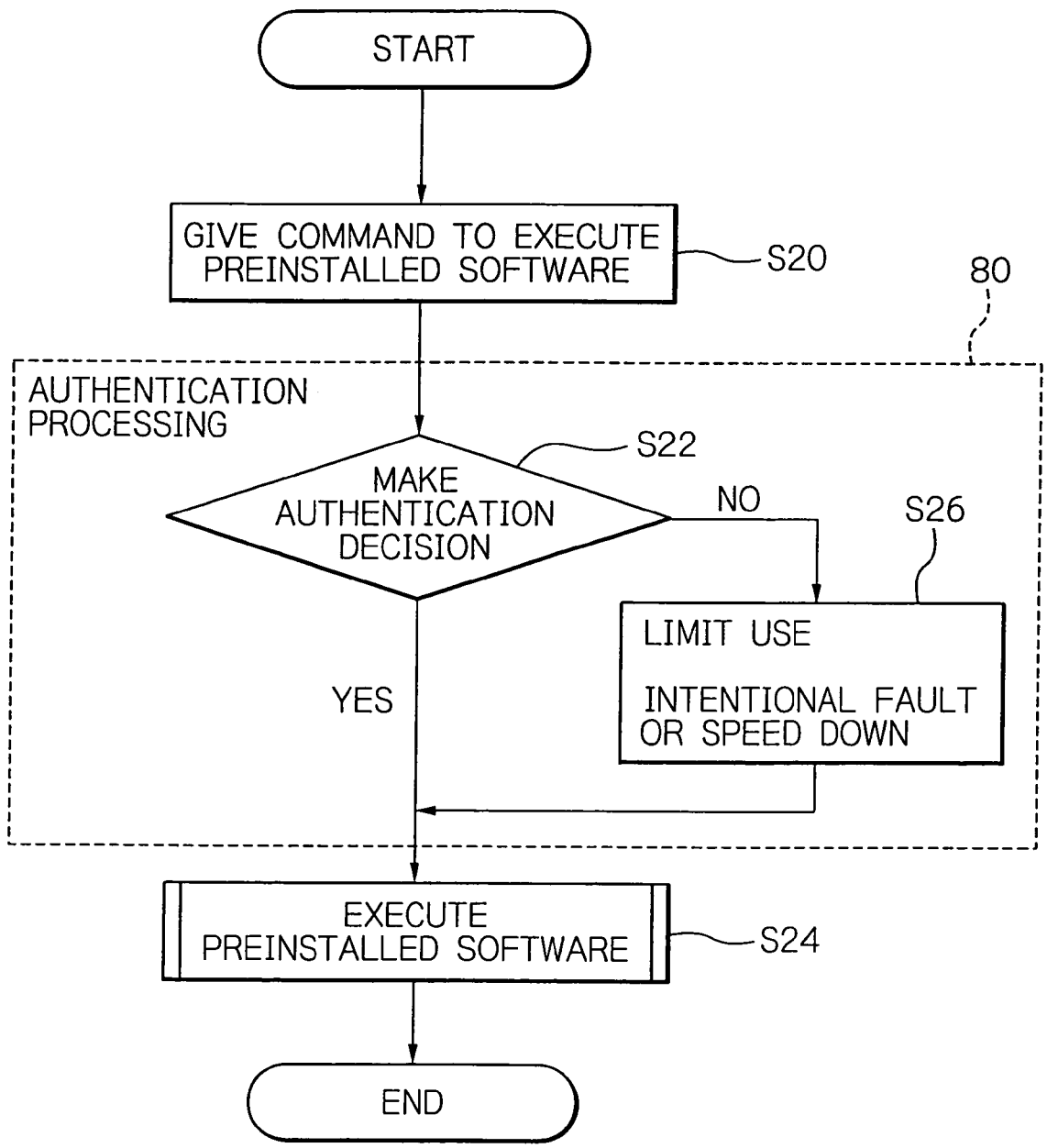
FIG. 4 is a flowchart exemplifying a specific protection procedure practicable with the software module shown in FIG. 1.

Reference will now be made to FIG. 4 for describing a specific procedure which the software module 22 of FIG. 1 executes for restricting the use of software. Assume that an input unit is connected to the central processor 10, FIG. 1 although not shown specifically. Then, when a command signal instructing an execution of the preinstalled software 21 is input on the input unit, the address generator 32 reads out an instruction for executing the preinstalled software 21 from the general-purpose memory 29, and the instruction thus read out is transferred to the decoder 34. Also, when hardware including the central processor 10 and general-purpose memory 29, FIG. 1, but regardless of whether or not it includes such an input unit, requires to carry out the function of the preinstalled software 21, the address decoder 32 automatically reads out the instruction for executing the preinstalled software from the general-purpose memory 29, and the instruction thus read out is fed to the decoder 34.

As shown in FIG. 4, if the result from the decoding of the instruction by the decoder 34 reveals the execution instruction of the preinstalled software (step S20), then the decoder 34 sends the instruction to the address generator 32. In response, the address generator 32 reads out the authenticating program 23 from the software module 22 of the program memory 20, and sends the data stream of the program 23 to the decoder 34. This is followed by an authentication decision step S22 included in authentication processing 80.

In the authentication decision step S22, the decoder 34 decodes instructions of the authenticating program 23 and feeds the instructions thus decoded to the ALU 52. In response, the ALU 52 starts performing operations by using the specific register 54, general-purpose register 56 and general-purpose memory 29. Specifically, the operations include one for writing, e.g. an appropriate value into the specific register 54. The value thus stored in the specific register 54 is copied into the general-purpose memory 29 and then confirmed by the address generator 32. If the value is correctly recorded in the general-purpose register 29, then the presence of the specific register 54 can be confirmed.

As stated above, by determining whether or not information can be written into the specific register 54, it is determined whether or not the hardware includes the specific register 54. It is to be noted that the presence or provision of the specific register 54 may be confirmed by any suitable method other than the method described above.

If the answer of the step S22 is positive (YES), meaning that the specific register 54 is present, then a preinstalled software executing routine S24 is executed. More specifically, the address generator 32 reads out an instruction for causing the preinstalled software 21 to be executed from the general-purpose memory 29. The decoder 34 decodes the above instruction and returns the result from the decoding to the address generator 32. The address generator 32 then reads out the preinstalled software 21 from the program memory 20 and feeds the software 21 to the decoder 34 for thereby causing the software 21 to be executed.

On the other hand, if the answer of the step S22 is negative (NO), meaning that the specific register 54 is absent as with the processor unit 12, FIG. 2, then a use limiting step S26 included in the authentication processing 80 is executed. In the step S26, the address generator 32 reads out an instruction for executing the illegality processing program 24 from the general-purpose memory 29 and feeds the instruction to the decoder 34. In response, the decoder 34 decodes the instruction and then returns the result from the decoding to the address generator 32. The address generator 32 then reads out the illegality processing program 24 from the software module 22 of the program memory 20 and delivers the data stream of the program 24 to the decoder 24, so that the program 24 is executed. The illegality processing program 24 is configured to intentionally give rise to a fault or difficulty, or to intentionally lower the processing speed during the execution of the preinstalled software 21. The illegality processing program 24 is built in part of the software module 22.

As stated above, the illegality processing program 24 is executed during the execution of the software module 22 so as to give a penalty, e.g. an intentional fault or difficulty onto the execution of the program sequence included in the software module 22 or an intentional reduction onto the processing speed. The use limiting step S26, executing the illegality processing program 24, may thus be executed, as shown in FIG. 4, before the routine S24 in which the preinstalled software 21 is executed.

On the other hand, the use limiting step S26, FIG. 4, may be incorporated, if desired, in the routine S24 executing the preinstalled software 21. More specifically, the illegality processing program 24 may be designed to incur such a penalty on the processor unit 12, FIG. 2, not provided with the specific resistor 54 as to take a period of time longer than a period of time for causing the central processor 10, FIG. 1, provided with the specific resistor 54 to execute the preinstalled software 21. This can specifically be implemented by introducing a delay time in the routine S24 for executing the preinstalled software 21. Consequently, the user scarcely notices the use limiting step S26 under way because the preinstalled software 21 will be executed to the last although taking a long period of time. This, coupled with the fact that a wastefully longer period of time is required for the preinstalled software 21 to end, makes it substantially impossible to utilize the preinstalled software 21.

If desired, the illegality processing program 24 may be designed to cause an operation practically impertinent to the preinstalled software 24 to be effected. In such an impertinent operation may be performed once in a while during the execution of the preinstalled software 21, i.e. routine S24. The impertinent operation is expected to cause the user to misunderstand, without noticing the use limiting step S26 under way, that the preinstalled software 21 itself may have bugs. Even if the unauthorized person notices the use limiting step S26 under way, the preinstalled software 21 itself continues executed to run to the last and does neither fall in an infinite loop nor end in an abnormal way. It is therefore difficult for the illegality processing program 24 to be revealed or invalidated.

The software module 22, having a program sequence to be executed as a penalty stated above, is distributed in a format generally referred to as a binary or a library format. Such a format includes a series of numerals described in a machine language which is far more difficult to read than a high-level language such as C language, FORTRAN, and hence to locate the portion with the penalty involved.

After the use limiting step S26, the preinstalled software 21 is executed without exception in the same manner as in the routine S24. However, the illegality processing program 24 is executed at the same time as the preinstalled software 21, giving rise to a fault or lowering the processing speed to the extent that the preinstalled software 21 is substantially unusable. Further, even if the penalty is noticed by the user, the program does not stop halfway because the penalty is necessarily followed by the execution of the preinstalled software S24. It follows that the user cannot break the protection of the program with the penalty without confirming the entire program which is extremely difficult to read. Considering trade-offs between a period of time necessary for breaking the protection and the value of the program to be obtained thereby, the above effort seems to be practically wasteful.

Figure 5:
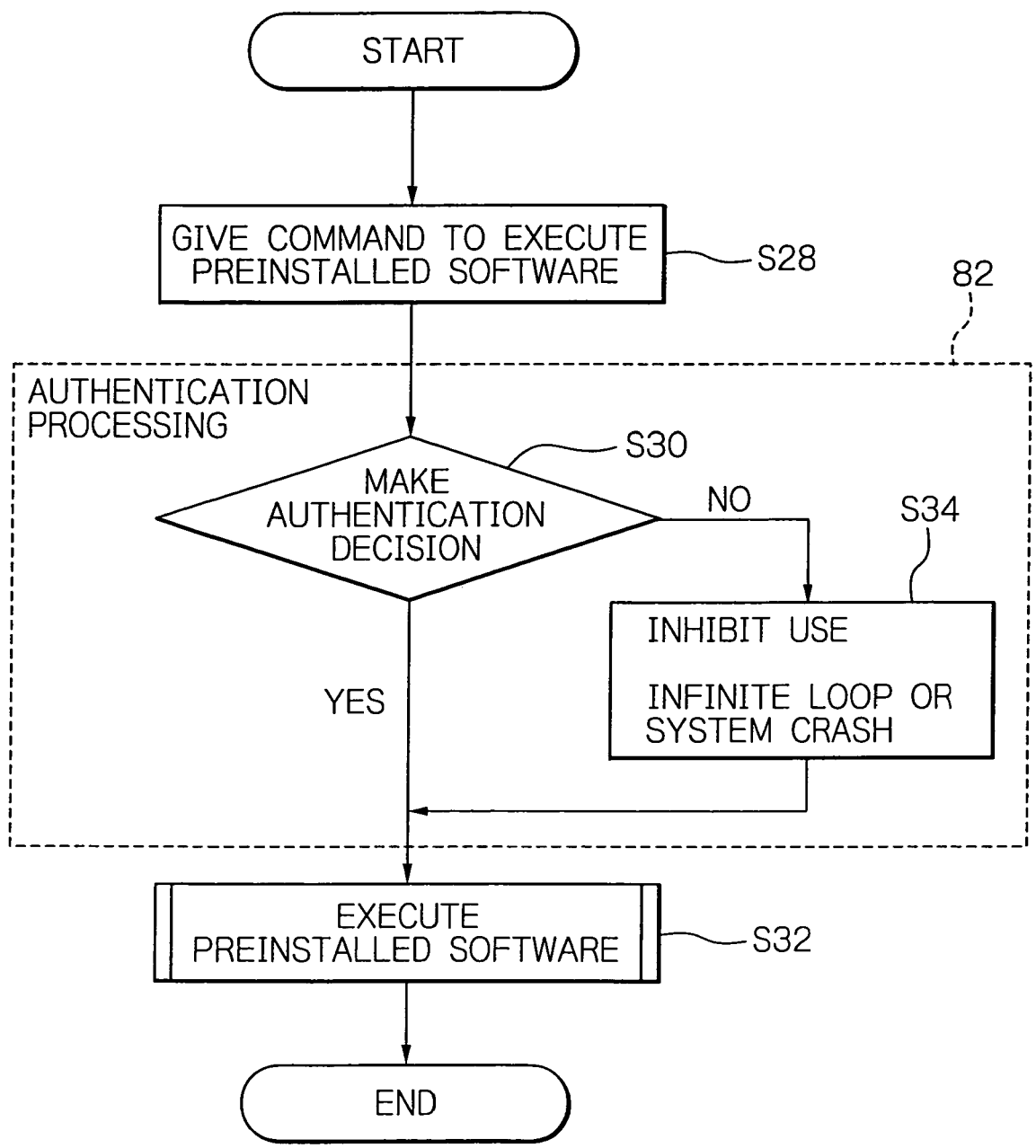
FIG. 5 is a flowchart useful for understanding a conventional method of obviating illicit use of software.

FIG. 5 demonstrates a conventional method of obviating the illicit use of preinstalled software. As shown, after the execution of preinstalled software has been commanded (step S28), an authentication decision (step S30) included in authentication processing 82 is made. If the answer of the step S30 is YES, meaning that the preinstalled software is allowed to be executed, the preinstalled software is executed (step S32) . However, if the answer of the step S30 is NO, meaning that the preinstalled software is inhibited from being executed, a use inhibiting step S34, included in the authentication processing 82, is executed. Specifically, the same processing is limitlessly repeated or the system is caused to crash, so that the preinstalled software is not executed at all. It is therefore easy for a user to locate the portion of the program where the inhibiting step S34 is executed and therefore to break the protection.

Figure 6:
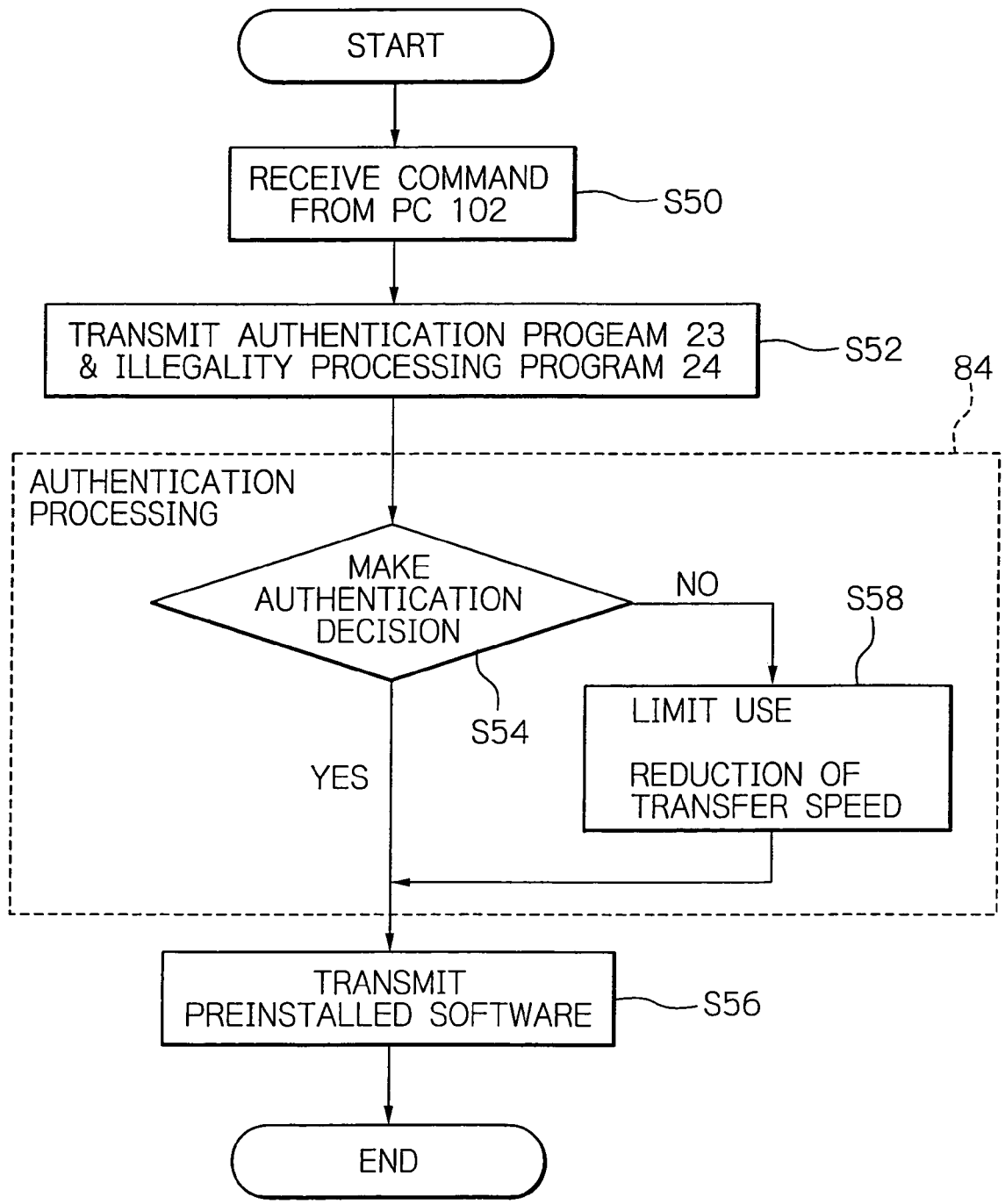
FIG. 6 is a flowchart useful for understanding a specific operation of the application of the present invention shown in FIG. 7.
Figure 7:
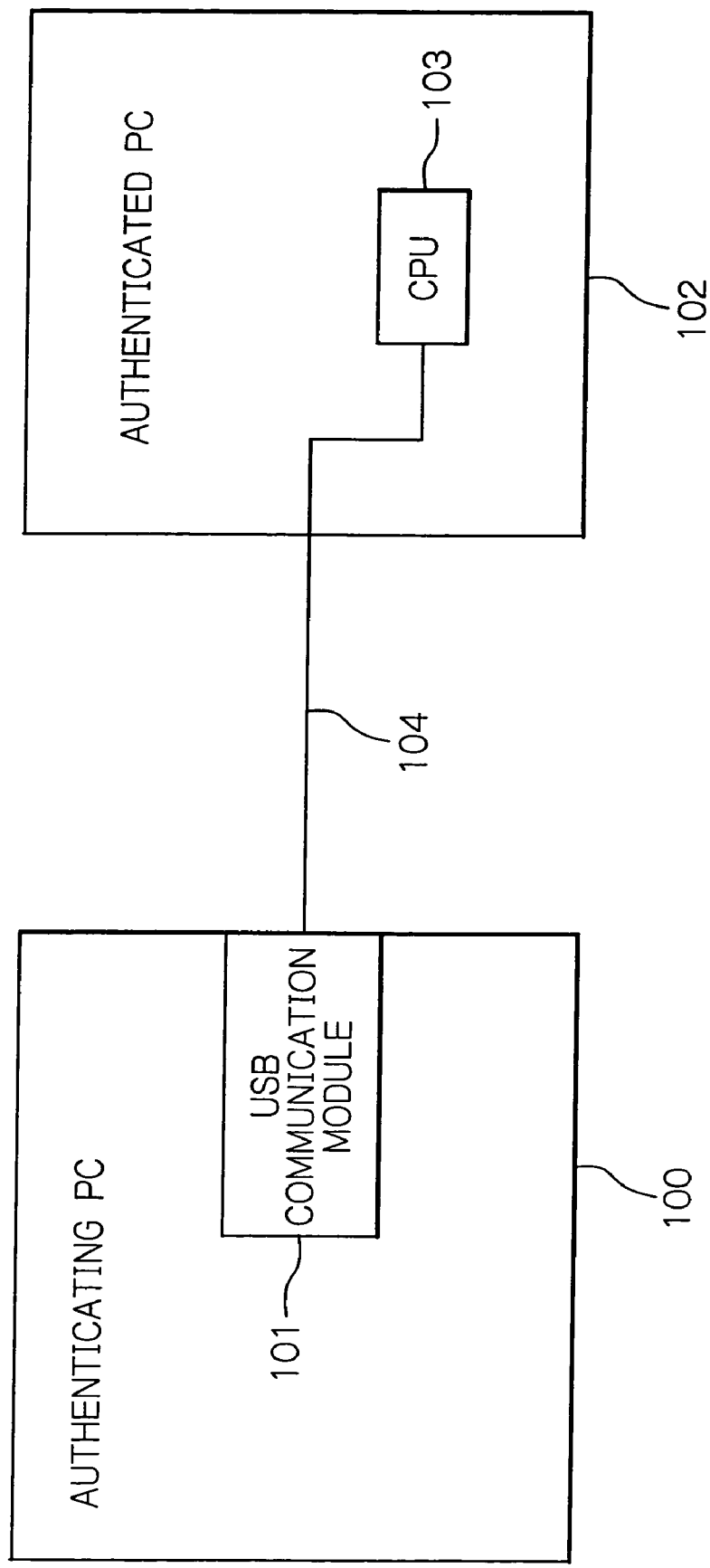
FIG. 7 is a block diagram schematically showing an exemplified application of the present invention in which preinstalled software data are transmitted from the USB (Universal Serial Bus) communication module of an authenticating personal computer over a USB cable to an authenticated personal computer.

FIGS. 6 and 7 show an alternative embodiment of the present invention. FIG. 7 depicts a specific system in which the data stream of the preinstalled software 21 is transferred from a USB (Universal Serial Bus) communication module 101 included in an authenticating personal computer (PC) to another personal computer to be authenticated 102 over a USB cable 104. In the illustrative embodiment, therefore, the personal computer to be authenticated, referred to simply as authenticated personal computer, 102 determines whether or not it is allowed to use the preinstalled software 21. More specifically, as shown in FIG. 6, in the command reception step from the personal computer (step S50), the authenticating personal computer 100 receives a preinstalled software send command from the authenticated personal computer 102 over the USB cable 104. At this time, the authenticating personal computer 100 does not immediately send out the preinstalled software 21 to the authenticated personal computer 102, but instead the data stream of the authenticating program 23 and illegality processing program 24 (step S52).

In response, the authenticated personal computer 102 causes the authenticating program 23 to be executed. More specifically, the personal computer 102 makes an authentication decision (step S54) included in authentication processing 84 in the same manner as the embodiment of FIG. 1, thereby determining whether or not a central processor 103 included in the personal computer 102 includes a specific type of CPU, which is authorized in running the preinstalled software 21.

If the answer of the step S54 is YES, meaning that the central processor 103 of the authenticated personal computer 102 includes a specific type of CPU, then the personal computer 102 sends out the decision result to the authenticating personal computer 100. In response, the authenticating personal computer 100 starts sending out the data stream of the preinstalled software 21 to the authenticated personal computer 102 (step S56).

If in the step S54 the answer is NO, then the authenticated personal computer 102 executes the illegality processing program 24 for the limitation of use (step S58), and then sends out the result to the authenticating personal computer 100. On receiving the above result, the authenticating personal computer 100 transmits the data stream of the preinstalled software 21 to the authenticated personal computer 102 (step S56). At this instant, the transfer rate of the preinstalled software 21 is far lower than usual because the illegality processing program 24 is under execution by the authenticated personal computer 102.

Specific operations of the illustrative embodiments stated above will be described hereinafter. First, assume that the program memory 20 is present in the central processor 10 as shown in FIG. 1 and that a manual input unit, not shown, is connected to the central processor 10. Then, when a command to execute the preinstalled software 21 is input on the input unit, the address generator 32 should only read out an instruction to execute the preinstalled software 21 from the general-purpose memory 29 and feed it to the decoder 34. Alternatively, when the hardware, including the central processor 10 and general-purpose memory 29 shown in FIG. 1, requires the function of the preinstalled software 21 without regard to whether or not the input unit is provided, the address generator 32 may automatically readout an instruction to execute the preinstalled software 21 from the general-purpose memory 29 and feed it to the decoder 34, in turn executing the preinstalled software 21. When the result of decoding by the decoder 34 is indicative of the preinstalled software execution instruction S20, then the decoder 34 delivers the instruction to the address generator 32.

Upon receiving the above instruction, the address generator 32 reads out the authenticating program 23 from the software module 22 of the program memory 20 and delivers it to the decoder 34 for there by making the authentication decision S22 included in the authentication processing 80. The decoder 34 decodes the instructions in the authenticating program 23 and feeds the ALU 52 sequentially with the decoded instructions. In turn, the ALU 52 starts performing operations in accordance with the instructions by using the specific register 54, and the general-purpose register 56 and memory 29. The operations include, e.g. writing any desired value in the specific register 54. The value thus stored in the specific register 54 is copied in the general-purpose memory 29, and the address generator 32 confirms the content stored in the general-purpose memory 29. If it is confirmed that the value is correctly recorded in the general-purpose memory 29, then it is determined the hardware 10 includes the specific register 54.

If the specific register 54 is determined as present (YES, step S22) in the central processor 10, it has been confirmed that the preinstalled software 21 is not an illicit duplicate so as to allow the preinstalled software 21 to be executed (step S24). More specifically, the address generator 32 reads out an instruction to execute the preinstalled software 21 from the general-purpose memory 29 and feeds it to the decoder 34. The decoder 34 decodes the above instruction and returns the result of decoding to the address generator 32. In response, the address generator 32 reads out the instructions contained in the preinstalled software 21 from the program memory 20 and delivers the instructions of the software 21 to the decoder 34 to run the software 21.

On the other hand, if it is determined in step S22 that the specific register 54 is absent (NO), meaning that the preinstalled software 21 is an illicit copy, the address generator 32 executes the use limiting step S26 included in the authentication processing 80. More specifically, the address generator 32 reads out an instruction to execute the illegality processing program 24 from the general-purpose memory 29. The instruction thus read out is transferred to the decoder 34. The decoder 34 decodes the instruction input from the general-purpose memory 29 and provides the result of decoding to the address generator 32. In response, the address generator 32 reads out the illegality processing program 24 from the software module 22, feeds the program 24 to the decoder 34 and causes it to execute the program 24. As a result, when the preinstalled software 21 is going to be executed, a fault is intentionally brought about or the processing speed is intentionally lowered.

The use limiting step S26 is necessarily followed by the step S24 for executing the preinstalled software 21. This is followed by the same operation as in the preinstalled software executing routine S24, but the function of the preinstalled software 21 is not fully enjoyed because the illegality processing program 24 is executed at the same time as the preinstalled software 21.

The embodiment shown in FIG. 3, in which the program memory 20 is located outside of the central processor 10, operates in the same manner as the embodiment shown in FIG. 1 except that an instruction read out by the address generator 32 from the program memory 20 is necessarily fed to the decoder 34 by way of the external bus interface 38.

A specific procedure to be executed by the embodiment of FIGS. 6 and 7 when applied to USB communication will be described hereinafter. A preinstalled software send instruction is transferred from the authenticating personal computer 100 to the authenticated personal computer 102 on the USB cable 104. In response, the authenticating personal computer 100 does not immediately send out the preinstalled software 21 to the authenticated personal computer 102, but the data stream of the authenticating program 23 and illegality processing program 24 (step S52). At this time, the authenticated personal computer 102 causes the authenticating program 23 to be executed. More specifically, the authentication decision is made (step S54) in the authentication processing 84 in the same manner as in the procedure of FIG. 1, thereby determining whether or not the central processor 103 of the authenticated personal computer 102 includes a specific type of CPU.

If the central processor 103 of the authenticated personal computer 102 is a specific type of CPU, i.e. the preinstalled software 21 is determined as not an illegal copy, then the authenticated personal computer 102 sends out the result of decision to the authenticating personal computer 100. In response, the authenticating personal computer 100 starts sending out the data stream of the preinstalled software 21 to the authenticated personal computer 102 (step S56).

If in step S54 the central processor 103 of the authenticated personal computer 102 is determined as not a specific type of CPU, meaning that the use of the preinstalled software 21 is illicit, the authenticated personal computer 102 transfers its control to the use limiting routine S58 to execute the illegality processing program 24, and then sends out the result to the authenticating personal computer 100. In response, the authenticating central processor 100 sends out the data stream of the preinstalled software 21 to the authenticated personal computer 102 (step S56) at the transfer rate which is far lower than the usual transfer rate while the illegality processing program 24 is executed in the routine S58 by the authenticated personal computer 102. This makes it substantially impossible for the user to use the preinstalled software 21 on the personal computer 102 to be authenticated.

The entire disclosure of Japanese patent application No. 2004-284440 filed on Sep. 29, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of limiting software usage, on unauthorized hardware, comprising:
   a first step of determining, before the software is executed on first hardware, whether or not the first hardware has a specific structural configuration inherent in authorized of hardware;
   a second step of executing, if it is determined that the first hardware is authorized hardware that has the specific structural configuration, the software on the first hardware; and
   a third step of executing, if it is determined that the first hardware is unauthorized hardware that does not have the specific structural configuration, the software on the first hardware in a first period of time that is longer than a second period of time required for authorized hardware to execute the software, whereby the presence of said method itself is concealed.

2. The method in accordance with claim 1, wherein in said third step an operation other than an operation to be performed by the software is performed, whereby the software is executed in the first period of time.

3. The method in accordance with claim 1, wherein the hardware includes a central processor unit, and the specific structural configuration comprises a register specific to the central processor unit.

4. The method in accordance with claim 3, wherein in said first step it is determined whether or not information can be written into the register to thereby determine whether or not the first hardware has the register.

5. The method in accordance with claim 1, wherein the first period of time is established by the software executed with a delay introduced in the software.

6. The method in accordance with claim 1, wherein said third step continues to execute the software to a final step of the software even when it is determined that the first hardware does not have the specific structural configuration.

7. The method in accordance with claim 2, wherein said third step continues to execute the software to a final step of the software even when it is determined that the first hardware does not have the specific structural configuration.

8. The method in accordance with claim 5, wherein said third step continues to execute the software to a final step of the software even when it is determined that the first hardware does not have the specific structural configuration.

9. The procedure in accordance with claim 1, wherein the specific structural configuration comprises a specific register, and the first step comprises determining whether the specific, register is present in the first hardware.

10. A procedure of limiting software usage, on unauthorized hardware, comprising:
    a first step of determining, before the software is executed on first hardware, whether or not the first hardware has a specific structural configuration inherent in authorized hardware; and
    a second step of executing, if it is determined that the first hardware is unauthorized hardware that does not have the specific structural configuration, the software on the first hardware with a penalty incorporated therein to impair execution of the software,
    wherein, as the penalty, said second step executes the software in a first period of time that is longer than a second period of time required for authorized hardware to execute the software.

11. The procedure in accordance with claim 10, wherein the first period of time is established by the software executed with a delay introduced in the software.

12. The procedure in accordance with claim 10, wherein in said second step an operation other than an operation to be performed by the software is executed in the first period of time.

13. The procedure in accordance with claim 10, wherein said second step continues to execute the software to a final step of the software even when it is determined that the first hardware does not have the specific structural configuration.

14. The procedure in accordance with claim 10, further comprising a third step of executing the software on the first hardware if it is determined that the first hardware has the specific structural configuration.

15. The procedure in accordance with claim 10, wherein the specific structural configuration comprises a specific register, and the first step comprises determining whether the specific register is present in the first hardware.

* * * * *